(12) United States Patent
Park et al.

(10) Patent No.: US 9,847,170 B2
(45) Date of Patent: *Dec. 19, 2017

(54) MULTILAYER CERAMIC CAPACITOR AND BOARD HAVING THE SAME

(71) Applicant: SAMSUNG ELECTRO-MECHANICS CO., LTD., Suwon-Si, Gyeonggi-Do (KR)

(72) Inventors: Sang Soo Park, Suwon-Si (KR); Min Cheol Park, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 160 days.

This patent is subject to a terminal disclaimer.

(21) Appl. No.: 14/656,668

(22) Filed: Mar. 12, 2015

(65) Prior Publication Data

US 2016/0086731 A1    Mar. 24, 2016

(30) Foreign Application Priority Data

Sep. 23, 2014   (KR) ........................ 10-2014-0127167

(51) Int. Cl.
*H01G 4/30* (2006.01)
*H01G 2/06* (2006.01)
(Continued)

(52) U.S. Cl.
CPC ............. *H01G 2/065* (2013.01); *H01G 4/012* (2013.01); *H01G 4/232* (2013.01); *H01G 4/30* (2013.01); *H01G 4/12* (2013.01); *H01G 4/224* (2013.01)

(58) Field of Classification Search
CPC .. H01G 4/30; H01G 4/06; H01G 4/35; H01G 4/228; H01G 4/012; H01G 4/12; H01G 4/248; H01G 4/1227
See application file for complete search history.

(56) References Cited

U.S. PATENT DOCUMENTS

| | | | |
|---|---|---|---|
| 2007/0102805 A1* | 5/2007 | Kim | H01G 4/236 257/698 |
| 2008/0158773 A1* | 7/2008 | Lee | H01G 4/005 361/306.3 |

(Continued)

FOREIGN PATENT DOCUMENTS

| | | |
|---|---|---|
| JP | 2013-502746 A | 1/2013 |
| KR | 2009-0059748 A | 6/2009 |
| WO | 2011/028551 A2 | 3/2011 |

*Primary Examiner* — Nguyen Ha
(74) *Attorney, Agent, or Firm* — McDermott Will & Emery LLP

(57) ABSTRACT

A multilayer ceramic capacitor may includes a ceramic body in which first and second dielectric layers are layered in a width direction, first and third internal electrodes disposed on the first dielectric layer and partially exposed to an upper surface of the ceramic body, second and fourth internal electrodes disposed on the second dielectric layer and partially exposed to a lower surface of the ceramic body, first and third external electrodes disposed on the upper surface of the ceramic body and connected to the first and third internal electrodes, respectively, second and fourth external electrodes disposed on the lower surface of the ceramic body and connected to the second and fourth internal electrodes, respectively, and a resistance layer disposed on the upper surface of the ceramic body to cover the first and third external electrodes.

20 Claims, 12 Drawing Sheets

(51) Int. Cl.
*H01G 4/012* (2006.01)
*H01G 4/232* (2006.01)
H01G 4/12 (2006.01)
H01G 4/224 (2006.01)

(56) References Cited

U.S. PATENT DOCUMENTS

| | | | | |
|---|---|---|---|---|
| 2009/0168298 A1* | 7/2009 | Togashi | ............... | H01G 4/012 |
| | | | | 361/306.3 |
| 2011/0056735 A1* | 3/2011 | Lee | ............... | H01G 4/005 |
| | | | | 174/260 |
| 2012/0134067 A1* | 5/2012 | Si | ............... | H01G 4/012 |
| | | | | 361/321.2 |
| 2013/0319741 A1* | 12/2013 | Ahn | ............... | H01G 4/30 |
| | | | | 174/260 |
| 2016/0111214 A1* | 4/2016 | Park | ............... | H01G 2/065 |
| | | | | 174/260 |

* cited by examiner

MULTILAYER CERAMIC CAPACITOR AND BOARD HAVING THE SAME

CROSS-REFERENCE TO RELATED APPLICATION

This application claims the priority and benefit of Korean Patent Application No. 10-2014-0127167 filed on Sep. 23, 2014, with the Korean Intellectual Property Office, the disclosure of which is incorporated herein by reference.

BACKGROUND

The present disclosure relates to a multilayer ceramic capacitor and a board having the same.

A multilayer ceramic capacitor, a multilayer chip electronic component, is a chip-shaped condenser mounted on the boards of various electronic products such as display devices such as liquid crystal displays (LCDs), plasma display panels (PDPs), and the like, computers, personal digital assistants (PDAs), smartphones, mobile phones, and the like, to serve to charge electricity therein or discharge electricity therefrom.

Since such multilayer ceramic capacitors have advantages such as small size, high capacitance, ease of mounting, and the like, such multilayer ceramic capacitors may be used as the components of various electronic devices.

Recently, as electronic components have been miniaturized and thinned, high frequency noise generated in internal circuits thereof has been problematic.

In order to solve the problem of high frequency noise, there is a need to adjust equivalent series resistance (ESR) of the capacitor.

RELATED ART DOCUMENT (Patent Document 1) Korean Patent Laid-Open Publication No. 2009-0059748
(Patent Document 2) Japanese Patent Laid-Open Publication No. 2013-502746

SUMMARY

An aspect of the present disclosure may provide a multilayer ceramic capacitor capable of easily obtaining the desired equivalent series resistance (ESR).

According to an aspect of the present disclosure, a multilayer ceramic capacitor may include: a ceramic body in which first and second dielectric layers are layered in a width direction of the ceramic body; a first internal electrode disposed on the first dielectric layer and partially exposed to an upper surface of the ceramic body; a second internal electrode disposed on the second dielectric layer and partially exposed to a lower surface of the ceramic body; a third internal electrode disposed on the first dielectric layer and partially exposed to the upper surface of the ceramic body; a fourth internal electrode disposed on the second dielectric layer and partially exposed to the lower surface of the ceramic body; a first external electrode disposed on the upper surface of the ceramic body and connected to the first internal electrode; a second external electrode disposed on the lower surface of the ceramic body and connected to the second internal electrode; a third external electrode disposed on the upper surface of the ceramic body, connected to the third internal electrode, and spaced apart from the first external electrode; a fourth external electrode disposed on the lower surface of the ceramic body, connected to the fourth internal electrode, and spaced apart from the second external electrode; and a resistance layer disposed on the upper surface of the ceramic body to cover the first and third external electrodes.

According to another aspect of the present disclosure, a multilayer ceramic capacitor may include: a ceramic body in which first and second dielectric layers are layered in a width direction of the ceramic body; a first internal electrode disposed on the first dielectric layer and partially exposed to an upper surface of the ceramic body; a second internal electrode disposed on the second dielectric layer and partially exposed to a lower surface of the ceramic body; third and fourth internal electrodes disposed on the first and second dielectric layers, respectively, and partially exposed to the upper and lower surfaces of the ceramic body; a first external electrode disposed on the upper surface of the ceramic body and connected to the first internal electrode; a second external electrode disposed on the lower surface of the ceramic body and connected to the second internal electrode; a third external electrode disposed on the upper surface of the ceramic body, connected to the third and fourth internal electrodes, and spaced apart from the first external electrode; a fourth external electrode disposed on the lower surface of the ceramic body, connected to the third and fourth internal electrodes, and spaced apart from the second external electrode; and a resistance layer disposed on the upper surface of the ceramic body to cover the first and third external electrodes.

According to another aspect of the present disclosure, a multilayer ceramic capacitor may include: a ceramic body in which first and second dielectric layers are layered in a width direction of the ceramic body; a plurality of first internal electrodes disposed on the first dielectric layer and partially exposed to an upper surface of the ceramic body; a plurality of second internal electrodes disposed on the second dielectric layer and partially exposed to a lower surface of the ceramic body; a plurality of upper external electrodes disposed on the upper surface of the ceramic body and respectively connected to the first internal electrodes; a plurality of lower external electrodes disposed on the lower surface of the ceramic body and respectively connected to the second internal electrodes; and a resistance layer disposed on the upper surface of the ceramic body to cover the upper external electrodes.

According to another aspect of the present disclosure, a board having a multilayer ceramic capacitor may include: a circuit board having first and second electrode pads formed on the circuit board; and the multilayer ceramic capacitor mounted on the circuit board, wherein the multilayer ceramic capacitor includes: a ceramic body in which first and second dielectric layers are layered in a width direction of the ceramic body; a first internal electrode disposed on the first dielectric layer and partially exposed to an upper surface of the ceramic body; a second internal electrode disposed on the second dielectric layer and partially exposed to a lower surface of the ceramic body; a third internal electrode disposed on the first dielectric layer and partially exposed to the upper surface of the ceramic body; a fourth internal electrode disposed on the second dielectric layer and partially exposed to the lower surface of the ceramic body; a first external electrode disposed on the upper surface of the ceramic body and connected to the first internal electrode; a second external electrode disposed on the lower surface of the ceramic body and connected to the second internal electrode; a third external electrode disposed on the upper surface of the ceramic body, connected to the third internal electrode, and spaced apart from the first external electrode;

a fourth external electrode disposed on the lower surface of the ceramic body, connected to the fourth internal electrode, and spaced apart from the second external electrode; and a resistance layer disposed on the upper surface of the ceramic body to cover the first and third external electrodes, the second external electrode being connected to the first electrode pad, and the fourth external electrode being connected to the second electrode pad.

According to another aspect of the present disclosure, a board having a multilayer ceramic capacitor may include: a circuit board having first and second electrode pads formed on the circuit board; and the multilayer ceramic capacitor mounted on the circuit board, wherein the multilayer ceramic capacitor includes: a ceramic body in which first and second dielectric layers are layered in a width direction of the ceramic body; a first internal electrode disposed on the first dielectric layer and partially exposed to an upper surface of the ceramic body; a second internal electrode disposed on the second dielectric layer and partially exposed to a lower surface of the ceramic body; third and fourth internal electrodes disposed on the first and second dielectric layers, respectively, and partially exposed to the upper and lower surfaces of the ceramic body; a first external electrode disposed on the upper surface of the ceramic body and connected to the first internal electrode; a second external electrode disposed on the lower surface of the ceramic body and connected to the second internal electrode; a third external electrode disposed on the upper surface of the ceramic body, connected to the third and fourth internal electrodes, and spaced apart from the first external electrode; a fourth external electrode disposed on the lower surface of the ceramic body, connected to the third and fourth internal electrodes, and spaced apart from the second external electrode; and a resistance layer disposed on the upper surface of the ceramic body to cover the first and third external electrodes, the second external electrode being connected to the first electrode pad, and the fourth external electrode being connected to the second electrode pad.

According to another aspect of the present disclosure, a board having a multilayer ceramic capacitor may include: a circuit board having a plurality of electrode pads formed on the circuit board; and the multilayer ceramic capacitor mounted on the circuit board, wherein the multilayer ceramic capacitor includes: a ceramic body in which first and second dielectric layers are layered in a width direction of the ceramic body; a plurality of first internal electrodes disposed on the first dielectric layer and partially exposed to an upper surface of the ceramic body; a plurality of second internal electrodes disposed on the second dielectric layer and partially exposed to a lower surface of the ceramic body; a plurality of upper external electrodes disposed on the upper surface of the ceramic body and respectively connected to the first internal electrodes; a plurality of lower external electrodes disposed on the lower surface of the ceramic body and respectively connected to the second internal electrodes; and a resistance layer disposed on the upper surface of the ceramic body to cover the upper external electrodes, the plurality of lower external electrodes being connected to the plurality of electrode pads, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
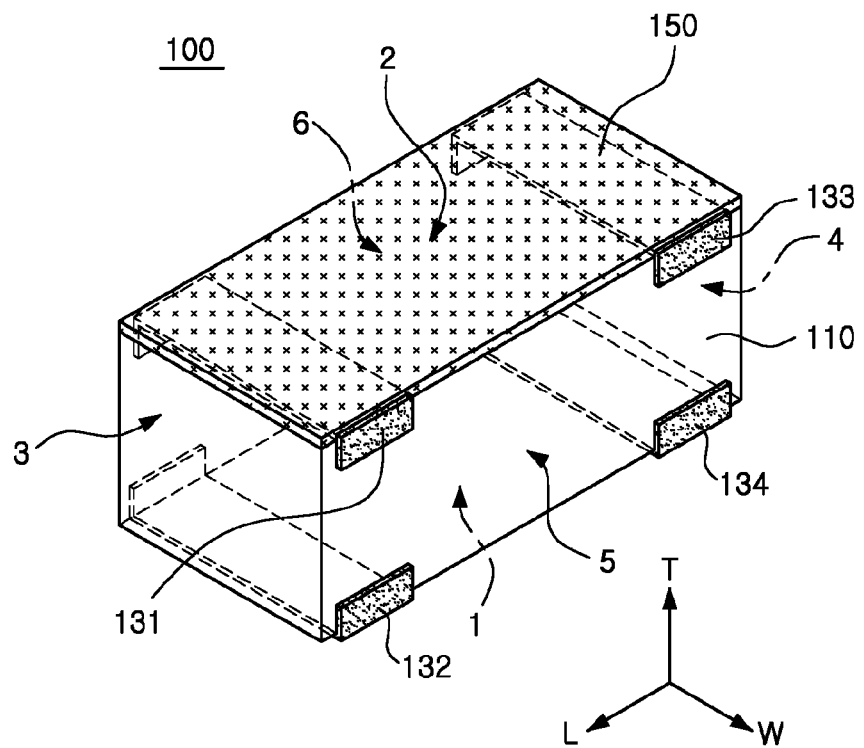
FIG. 1 is a schematic perspective diagram of a multilayer ceramic capacitor according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments of the present disclosure. L, W and T shown in the accompanying drawings refer to a length direction, a width direction, and a thickness direction, respectively.

Multilayer Ceramic Capacitor

FIG. 1 is a schematic perspective diagram of a multilayer ceramic capacitor 100 according to an exemplary embodiment of the present disclosure.

Referring to FIG. 1, the multilayer ceramic capacitor 100 according to an exemplary embodiment of the present disclosure may include a ceramic body 110 having lower and upper surfaces 1 and 2, first to fourth external electrodes 131 to 134, and a resistance layer 150.

The lower surface 1 of the ceramic body 110 may be provided as a mounting surface at the time of mounting the multilayer ceramic capacitor 100 on a circuit board.

The ceramic body 110 may be a hexahedron having the lower and upper surfaces 1 and 2, both end surfaces 3 and 4 in the length direction, and both side surfaces 5 and 6 in the width direction, but is not limited thereto.

In further detail, in an exemplary embodiment of the present disclosure, surfaces of the ceramic body 110 opposing each other in the thickness direction may be defined as lower and upper surfaces 1 and 2, surfaces connecting the lower and upper surfaces 1 and 2 to each other and opposing each other in the length direction may be defined as the first and second end surfaces 3 and 4, and surfaces opposing each other in the width direction may be defined as the first and second side surfaces 5 and 6.

Figure 2:
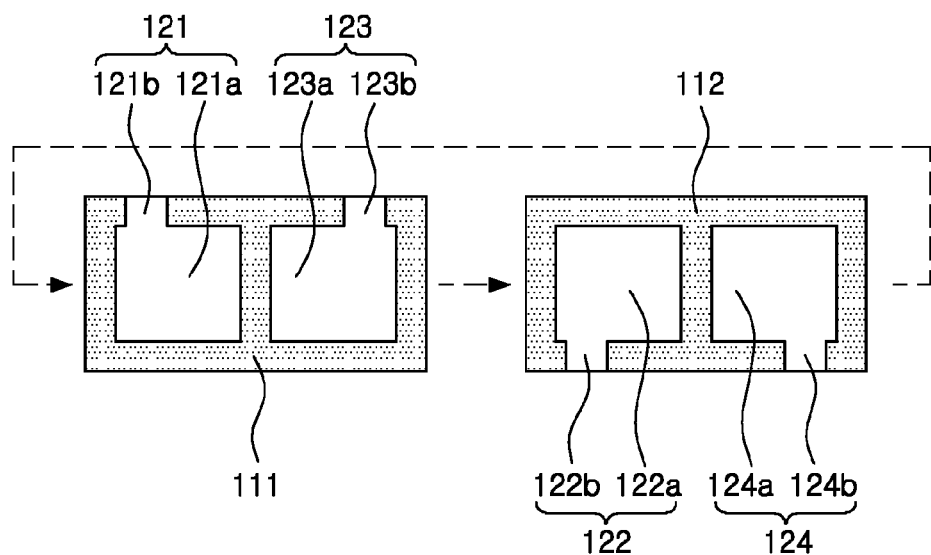
FIG. 2 is a plan diagram schematically showing an example of internal electrodes of the multilayer ceramic capacitor of FIG. 1.
Figure 3A:
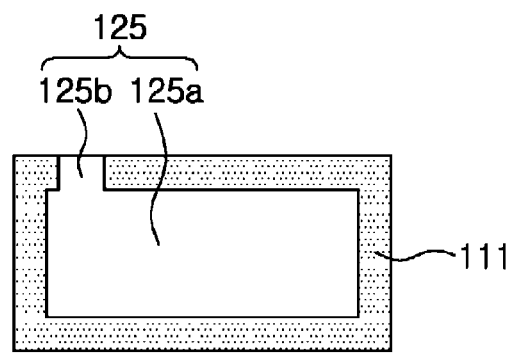
FIGS. 3A through 3D are plan diagrams schematically showing another example of the internal electrodes of the multilayer ceramic capacitor of FIG. 1.
Figure 3B:
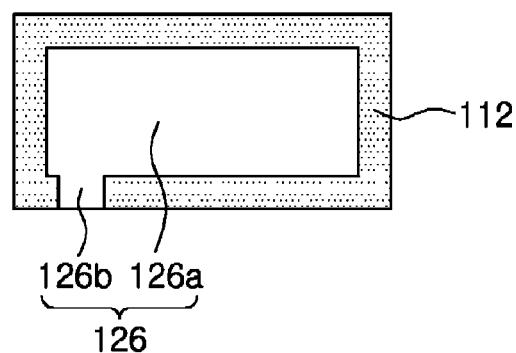
Figure 3C:
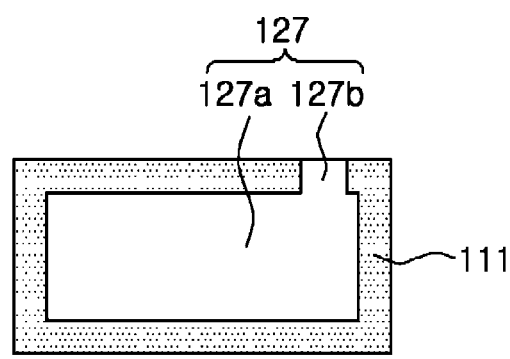
Figure 3D:
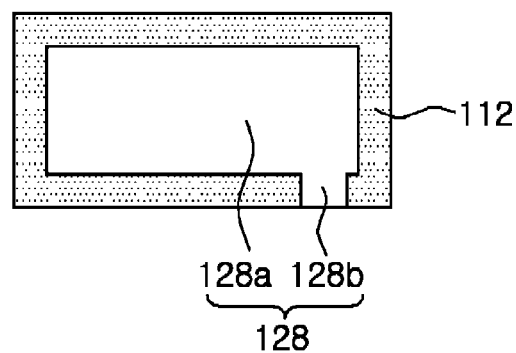

FIG. 2 is a plan diagram schematically showing an example of internal electrodes of the multilayer ceramic capacitor 100 of FIG. 1.

Referring to FIGS. 1 and 2, the ceramic body 110 may be formed by layering a plurality of dielectric layers 111 and 112 in the width direction and then sintering the layered dielectric layers.

However, a shape of the ceramic body 110 and the number of layered dielectric layers 111 and 112 are not limited to those of the exemplary embodiment of the present disclosure shown in FIGS. 1 and 2.

In addition, the plurality of dielectric layers 111 and 112 configuring the ceramic body 110 may be integrated to difficult to discern a boundary between the dielectric layers 111 and 112 adjacent to each other without using a scanning electron microscope (SEM).

First and third internal electrodes 121 and 123 may be disposed on a first dielectric layer 111, and second and fourth internal electrodes 122 and 124 may be disposed on a second dielectric layer 112.

For example, the first and third internal electrodes 121 and 123 may be spaced apart from each other and disposed on the same first dielectric layer 111, and the second and fourth internal electrodes 122 and 124 may be spaced apart from each other and disposed on the same second dielectric layer 112.

Each of the internal electrodes 121 to 124 may be disposed to be exposed to at least one surface.

Each of the internal electrodes 121 to 124 may include capacitance portions 121a to 124a contributing to forming capacitance of the capacitor and lead-out portions 121b to 124b exposed to one surface.

The first lead-out portion 121b may be extended from the first capacitance portion 121a to the upper surface 2 to be led to the upper surface 2 of the ceramic body 110, and the second lead-out portion 122b may be extended from the second capacitance portion 122a to the lower surface 1 to be led to the lower surface 1 of the ceramic body 110.

The first lead-out portion 121b of the first internal electrode 121 may be electrically connected to the first external electrode 131, and the second lead-out portion 122b of the second internal electrode 122 may be electrically connected to the second external electrode 132.

The first capacitance portion 121a of the first internal electrode 121 and the second capacitance portion 122a of the second internal electrode 122 may be overlapped with each other in the width direction and have different polarities from each other, thereby contributing to forming capacitance.

Similarly, the third lead-out portion 123b may be extended from the third capacitance portion 123a to the upper surface 2 to be led to the upper surface 2 of the ceramic body 110, and the fourth lead-out portion 124b may be extended from the fourth capacitance portion 124a to the lower surface 1 to be led to the lower surface 1 of the ceramic body 110.

The third lead-out portion 123b of the third internal electrode 123 may be electrically connected to the third external electrode 133, and the fourth lead-out portion 124b of the fourth internal electrode 124 may be electrically connected to the fourth external electrode 134.

The third capacitance portion 123a of the third internal electrode 123 and the fourth capacitance portion 124a of the fourth internal electrode 124 may be overlapped with each other in the width direction and have different polarities from each other, thereby contributing to forming capacitance.

In this case, capacitance of the multilayer ceramic capacitor 100 may be in proportion to an area of an overlapped region between the first and second internal electrodes and an area of an overlapped region between the third and fourth internal electrodes.

In addition, the entire capacitance of the multilayer ceramic capacitor 100 may be (capacitance of the first and second internal electrodes×capacitance of the third and fourth internal electrodes)/(capacitance of the first and second internal electrodes+capacitance of the third and fourth internal electrodes).

The first to fourth internal electrodes 121 to 124 as described above may be formed by printing a conductive paste containing a conductive metal on at least one surface of a ceramic sheet forming the dielectric layers 111 and 112.

The conductive metal of the conductive paste may be, for example, one of silver (Ag), palladium (Pd), platinum (Pt), nickel (Ni), and copper (Cu), an alloy thereof, or the like, but the present disclosure is not limited thereto.

In addition, as a printing method of the conductive paste, a screen printing method, a gravure printing method, or the like, may be used, but the present disclosure is not limited thereto.

Although not shown, a dielectric layer on which the internal electrode is not formed, for example, a cover layer may be formed on both end portions of the ceramic body 110 in the width direction.

The cover layer may serve to prevent the first to fourth internal electrodes 121 to 124 from being damaged by physical or chemical stress.

The dielectric layers 111 and 112 may contain a ceramic material having high permittivity.

For example, the dielectric layers 111 and 112 may contain barium titanate ($BaTiO_3$) based ceramic powder, or the like, but the present disclosure is not limited thereto as long as sufficient capacitance may be obtained.

In addition, if necessary, a ceramic additive, an organic solvent, a plasticizer, a binder, a dispersant, and the like, may be further contained in the dielectric layers 111 and 112 in addition to the ceramic material.

Here, as the ceramic additive, various kinds of ceramic additive such as a transition metal oxide or carbide, rare earth elements, magnesium (Mg), aluminum (Al), or the like, may be used.

FIGS. 3A through 3D are plan diagrams schematically showing another example of internal electrodes of the multilayer ceramic capacitor of FIG. 1.

Unlike the internal electrodes shown in FIG. 2, in the case of the internal electrodes shown in FIGS. 3A through 3D, first and third internal electrodes 125 and 127 may be disposed on different first dielectric layers 111 from each other, and second and fourth internal electrodes 126 and 128 may be disposed on different second dielectric layers 112 from each other.

For example, the first and third internal electrodes 125 and 127 may be disposed on different first dielectric layers 111 from each other, and the second and fourth internal electrodes 126 and 128 may be disposed on different second dielectric layers 112 from each other.

Each of the internal electrodes 125 to 128 may be disposed to be exposed to at least one surface.

Each of the internal electrodes 125 to 128 may include capacitance portions 125a to 128a contributing to forming capacitance of the capacitor and lead-out portions 125b to 128b exposed to one surface.

The first lead-out portion 125b may be extended from the first capacitance portion 125a to the upper surface 2 to be led to the upper surface 2 of the ceramic body 110, and the second lead-out portion 126b may be extended from the second capacitance portion 126a to the lower surface 1 to be led to the lower surface 1 of the ceramic body 110.

The first lead-out portion 125b of the first internal electrode 125 may be electrically connected to the first external electrode 131, and the second lead-out portion 126b of the second internal electrode 126 may be electrically connected to the second external electrode 132.

The first capacitance portion 125a of the first internal electrode 125 and the second capacitance portion 126a of the second internal electrode 126 may be overlapped with each other in the width direction and have different polarities from each other, thereby contributing to forming capacitance.

Similarly, the third lead-out portion 127b may be extended from the third capacitance portion 127a to the upper surface 2 to be led to the upper surface 2 of the ceramic body 110, and the fourth lead-out portion 128b may be extended from the fourth capacitance portion 128a to the lower surface 1 to be led to the lower surface 1 of the ceramic body 110.

The third lead-out portion 127b of the third internal electrode 127 may be electrically connected to the third external electrode 133, and the fourth lead-out portion 128b of the fourth internal electrode 128 may be electrically connected to the fourth external electrode 134.

The third capacitance portion 127a of the third internal electrode 127 and the fourth capacitance portion 128a of the fourth internal electrode 128 may be overlapped with each other in the width direction and have different polarities from each other, thereby contributing to forming capacitance.

In this case, capacitance of the multilayer ceramic capacitor 100 may be in proportion to an area of an overlapped region between the first and second internal electrodes and an overlapped region between the third and fourth internal electrodes.

Figure 4:
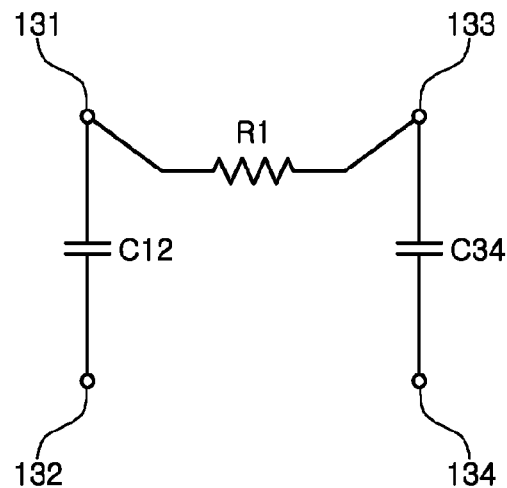
FIG. 4 is a schematic circuit diagram of a multilayer ceramic capacitor having the internal electrodes as shown in FIG. 2 or 3.
Figure 5:
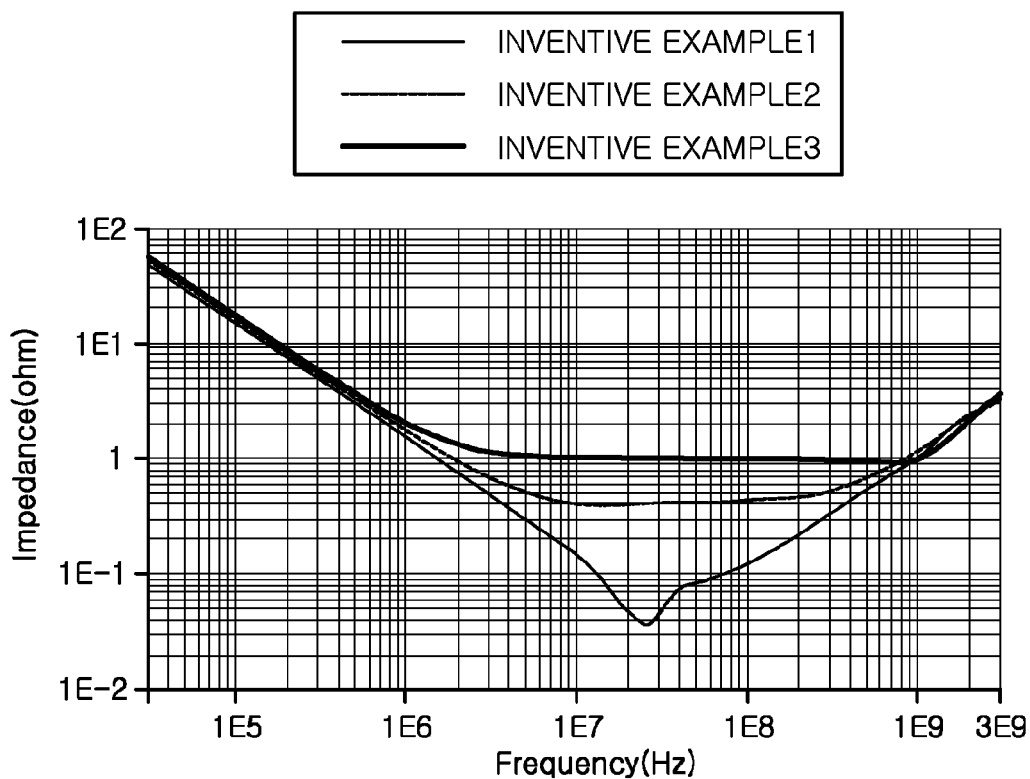
FIG. 5 is a graph obtained by measuring ESR depending on a resistance value of a resistance layer of a multilayer ceramic capacitor according to an exemplary embodiment of the present disclosure.

FIG. 4 is a schematic circuit diagram of a multilayer ceramic capacitor having the internal electrodes as shown in FIG. 2 or 3, and FIG. 5 is a graph obtained by measuring ESR of a multilayer ceramic capacitor according to an exemplary embodiment of the present disclosure.

Referring to FIGS. 1 through 4, the resistance layer 150 may be formed on the upper surface 2 of the multilayer ceramic capacitor 100 according to an exemplary embodiment of the present disclosure.

The resistance layer 150, which is to hinder a current flow to allow resistance characteristics to be implemented, may be adjusted so that a suitable resistance value may be implemented.

In order to adjust a resistance value of the resistance layer 150, a level of conductivity may be adjusted by changing a material of the resistance layer 150, or the resistance value may be adjusted by adjusting a thickness or size of the resistance layer 150.

Referring to FIG. 4, it may be appreciated that the multilayer ceramic capacitor according to an exemplary embodiment of the present disclosure has a structure in which a capacitor C12 and a capacitor C34 are connected in series with each other, having a resistor R1 therebetween.

A resistance value of the resistor R1 may be adjusted by a level of conductivity, the thickness, or the size of the resistance layer 150, such that accordingly, an ESR value of the multilayer ceramic capacitor may be adjusted.

For example, it may be appreciated that ESR is changed as shown in Inventive Examples 1 to 3 of FIG. 5 by adjusting the resistance value of the resistance layer 150.

In addition, since in the multilayer ceramic capacitor according to an exemplary embodiment of the present disclosure, the capacitors are disposed in series with each other, even though any one capacitor is shorted by overvoltage or mechanical stress, insulation resistance may be maintained, such that the multilayer ceramic capacitor may have high reliability.

Figure 6:
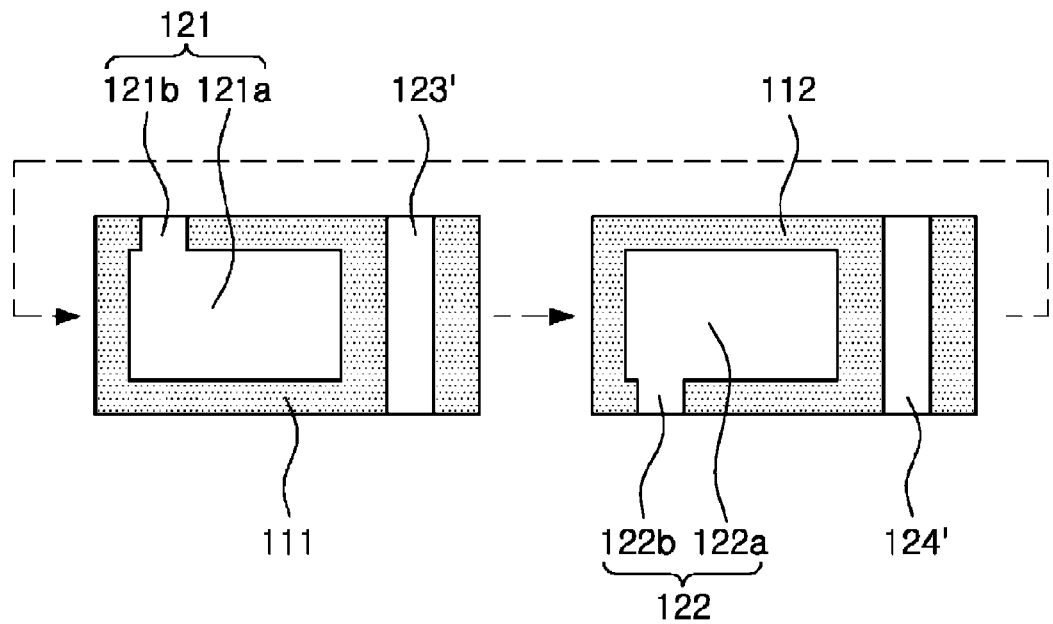
FIG. 6 is a plan diagram schematically showing another example of the internal electrodes of the multilayer ceramic capacitor of FIG. 1.
Figure 7:
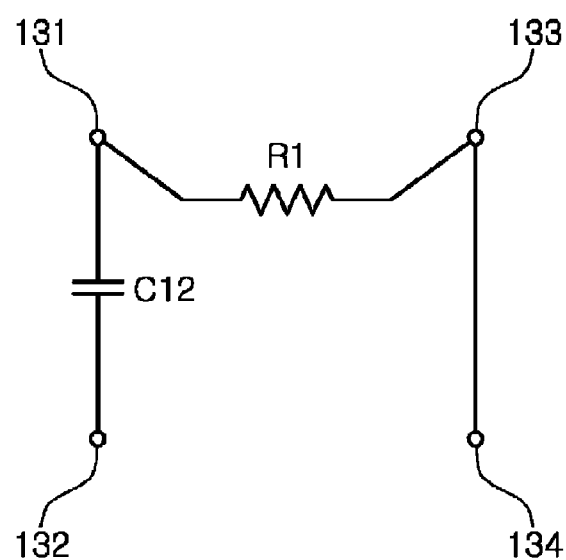
FIG. 7 is a schematic circuit diagram of a multilayer ceramic capacitor having the internal electrode as shown in FIG. 6.

FIG. 6 is a plan diagram schematically showing another example of the internal electrodes of the multilayer ceramic capacitor of FIG. 1, and FIG. 7 is a schematic circuit diagram of a multilayer ceramic capacitor having the internal electrode as shown in FIG. 6.

Structures of internal electrodes of a multilayer ceramic capacitor according to another exemplary embodiment of the present disclosure will be described with reference to FIGS. 6 and 7.

A first internal electrode 121 may be disposed on a first dielectric layer 111 and partially exposed to an upper surface 2 of a ceramic body 110, and a second internal electrode 122 may be disposed on a second dielectric layer 112 and partially exposed to a lower surface 1 of the ceramic body 110.

Third and fourth internal electrodes 123' and 124' may be disposed on the first and second dielectric layers 111 and 112, respectively, and partially exposed to the upper and lower surfaces 2 and 1 of the ceramic body 110.

The first and third internal electrodes 121 and 123' may be formed on the same first dielectric layer 111 and spaced apart from each other.

In addition, the second and fourth internal electrodes 122 and 124' may be formed on the same second dielectric layer 112 and spaced apart from each other.

The first and second internal electrodes 121 and 122 may include capacitance portions 121a and 122a contributing to forming capacitance of the capacitor and a lead-out portion 121b and 122b exposed to one surface.

The first lead-out portion 121b may be extended from the first capacitance portion 121a to the upper surface 2 to be led to the upper surface 2 of the ceramic body 110, and the second lead-out portion 122b may be extended from the second capacitance portion 122a to the lower surface 1 to be led to the lower surface 1 of the ceramic body 110.

The first lead-out portion 121b of the first internal electrode 121 may be electrically connected to a first external electrode 131, and the second lead-out portion 122b of the second internal electrode 122 may be electrically connected to a second external electrode 132.

The first capacitance portion 121a of the first internal electrode 121 and the second capacitance portion 122a of the second internal electrode 122 may be overlapped with each other in the width direction and have different polarities from each other, thereby contributing to forming capacitance.

On the other hand, the third and fourth internal electrodes 123' and 124' may be electrically connected to third and fourth external electrodes 133 and 134 at the same time to thereby serve as conducting wires.

In the multilayer ceramic capacitor according to another exemplary embodiment of the present disclosure, since capacitance is determined by a capacitor C12, the multilayer ceramic capacitor may have higher capacitance than that of the multilayer ceramic capacitor including the internal electrodes having the above-mentioned shapes shown in FIGS. 2 and 3.

For example, since a plurality of capacitors are not disposed in series with each other, high capacitance may be formed.

Figure 8:
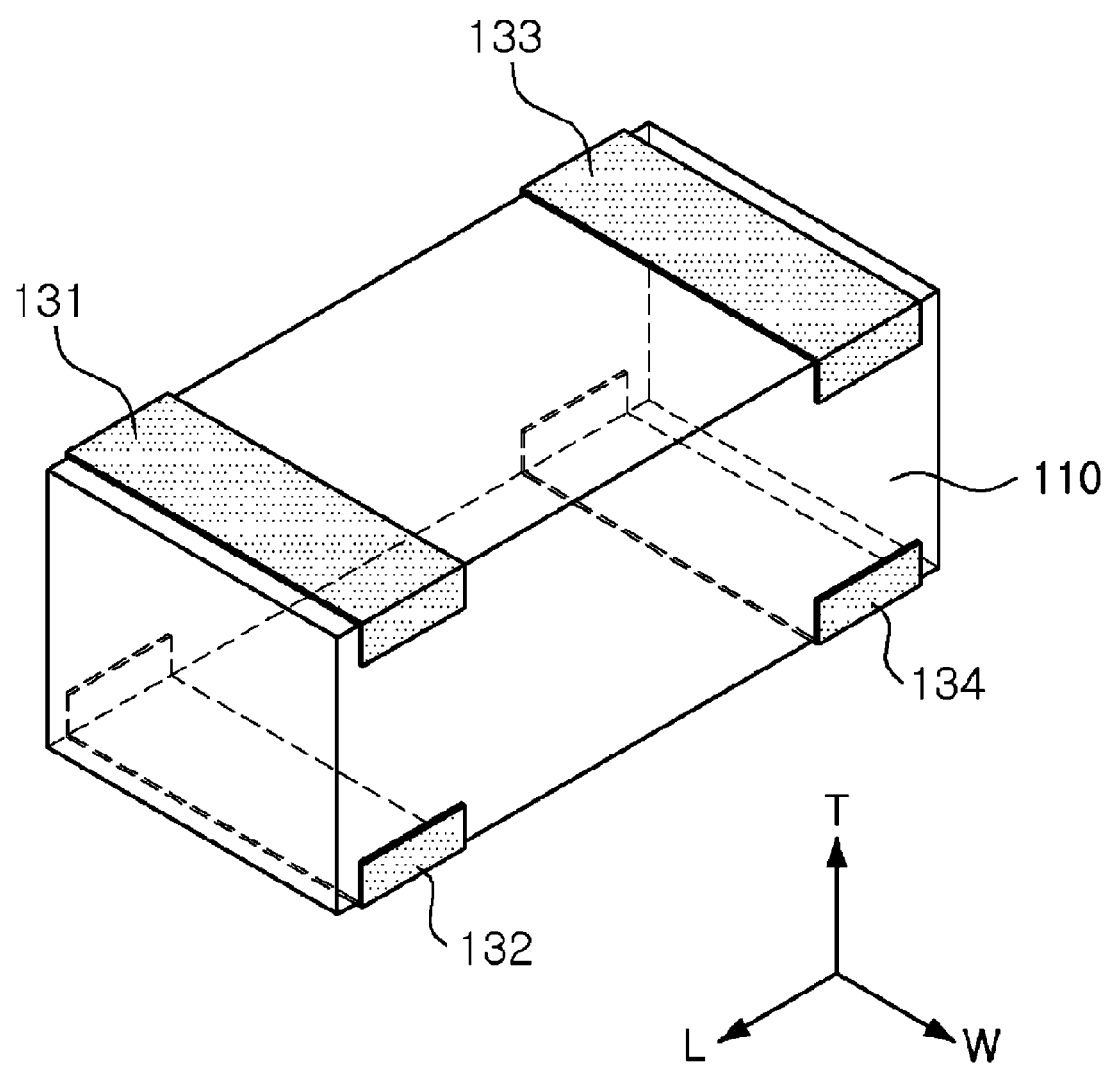
FIG. 8 is a schematic perspective diagram of a multilayer ceramic capacitor on which external electrodes are formed.

FIG. 8 is a schematic perspective diagram of the multilayer ceramic capacitor on which the external electrodes are formed.

The external electrodes 131 to 134 will be described with reference to FIG. 8.

The first and third external electrodes 131 and 133 may be formed on the upper surface 2 of the ceramic body 110 to be spaced apart from each other in the length direction, the first external electrode 131 may be connected to the first lead-out portion 121b of the first internal electrode 121, and the third external electrode 133 may be connected to the third lead-out portion 123b of the third internal electrode 123.

The second and fourth external electrodes 132 and 134 may be formed on the lower surface 1 of the ceramic body 110 to be spaced apart from each other in the length direction, the second external electrode 132 may be connected to the second lead-out portion 122b of the second internal electrode 122, and the fourth external electrode 134 may be connected to the fourth lead-out portion 124b of the fourth internal electrode 124.

In this case, the first and third external electrodes 131 and 133 may be extended from the upper surface 2 of the ceramic body 110 to portions of the side surfaces 5 and 6 of the ceramic body 110 in the width direction in order to improve adhesion strength.

Further, the second and fourth external electrodes 132 and 134 may be extended from the lower surface 1 of the ceramic body 110 to portions of the side surfaces 5 and 6 of the ceramic body 110 in the width direction in order to improve adhesion strength.

In the multilayer ceramic capacitor 100 having the above-mentioned electrode structure, a current loop may be decreased, such that equivalent series inductance (ESL) may be decreased.

Further, according to the exemplary embodiment of the present disclosure, even though a short-circuit defect occurs in one of the capacitors configuring the multilayer ceramic capacitor, the other capacitor may normally operate.

The first to fourth external electrodes 131 to 134 as described above may be formed of a conductive paste containing a conductive metal.

The conductive metal may be, for example, one of nickel (Ni), copper (Cu), and tin (Sn), an alloy thereof, or the like, but is not limited thereto.

The conductive paste may further contain an insulation material.

The insulation material may be, for example, glass, but the present disclosure is not limited thereto.

Further, in the present disclosure, a forming method of the first to fourth external electrodes 131 to 134 is not particularly limited, and the first to fourth external electrodes 131 to 134 may be formed by a method of dipping the ceramic body 110 in the conductive paste, or other methods such as a plating method, or the like.

Meanwhile, plating layers (not shown) may be further formed on the first to fourth external electrodes 131 to 134 by an electroplating method, or the like.

The plating layers may include nickel (Ni) plating layers formed on the first to fourth external electrodes 131 to 134 and tin (Sn) plating layers formed on the nickel plating layers.

The plating layer is to increase adhesion strength between the multilayer ceramic capacitor 100 and a circuit board at the time of mounting the multilayer ceramic capacitor 100 on the circuit board, or the like, by solder.

Figure 9:
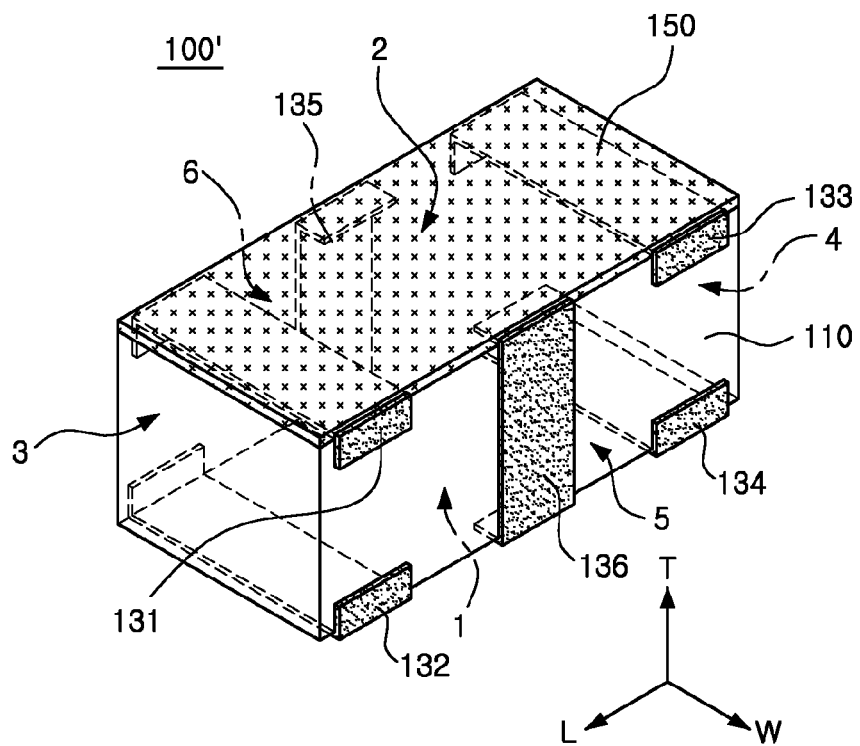
FIG. 9 is a schematic perspective diagram of a multilayer ceramic capacitor according to another exemplary embodiment of the present disclosure.
Figure 10:
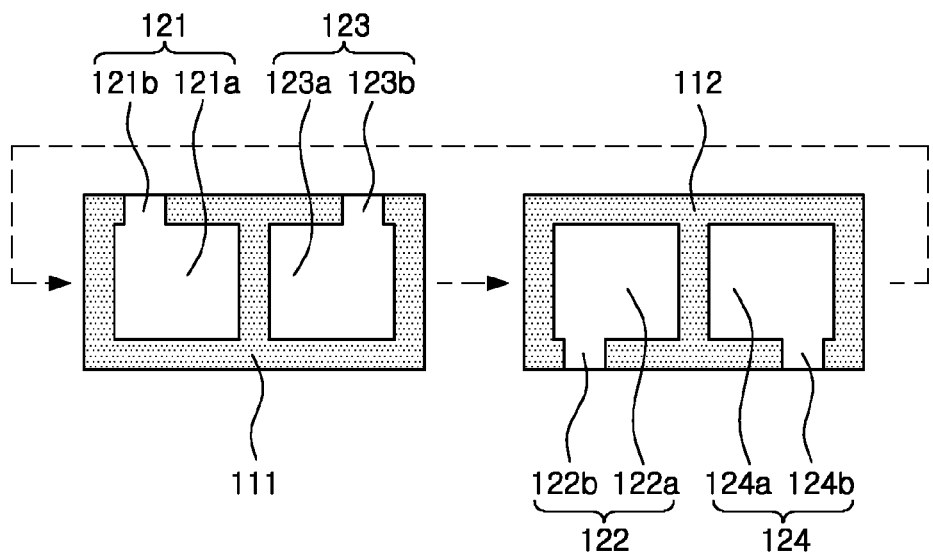
FIG. 10 is a plan diagram schematically showing an example of internal electrodes of the multilayer ceramic capacitor of FIG. 9.

FIG. 9 is a schematic perspective diagram of a multilayer ceramic capacitor 100' according to another exemplary embodiment of the present disclosure, and FIG. 10 is a plan diagram schematically showing an example of internal electrodes of the multilayer ceramic capacitor 100' of FIG. 9.

Figure 11:
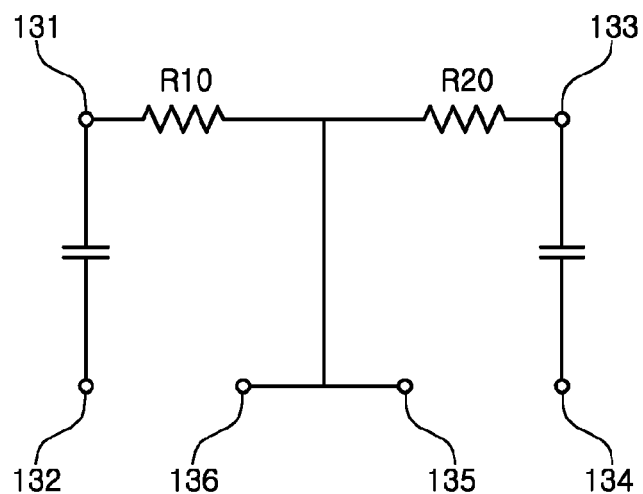
FIG. 11 is a schematic circuit diagram of the multilayer ceramic capacitor of FIG. 10.
Figure 12:
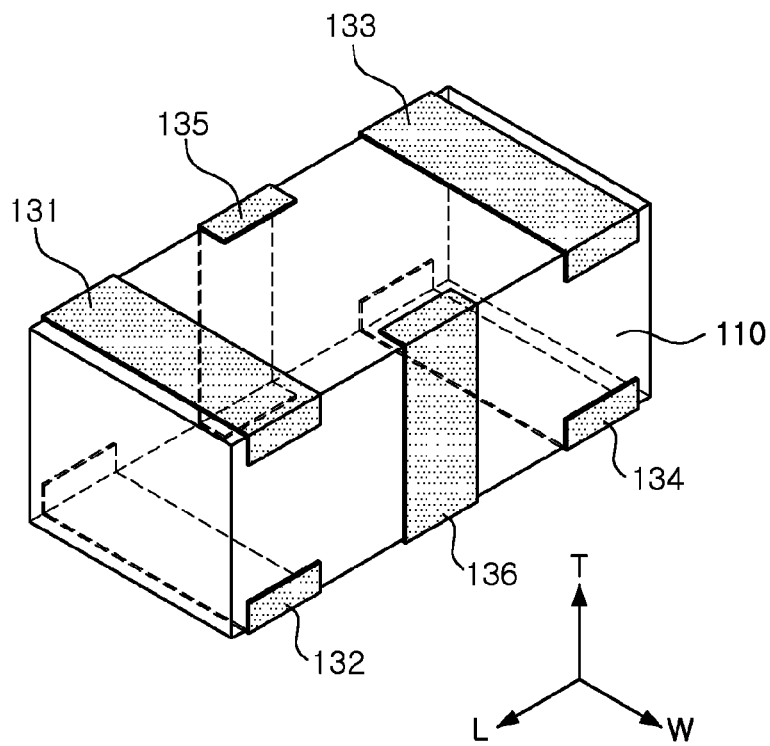
FIG. 12 is a schematic perspective diagram of a multilayer ceramic capacitor on which external electrodes are formed.

In addition, FIG. 11 is a schematic circuit diagram of the multilayer ceramic capacitor of FIG. 10, and FIG. 12 is a schematic perspective diagram of the multilayer ceramic capacitor 100' on which external electrodes are formed.

Referring to FIGS. 9 and 10, the multilayer ceramic capacitor 100' according to another exemplary embodiment of the present disclosure may further include fifth and sixth external electrodes 135 and 136 in addition to the multilayer ceramic capacitor 100 shown in FIG. 1, and the internal electrodes shown in FIG. 10 may have the same shapes as those of the internal electrodes shown in FIG. 2.

Referring to FIG. 12, the fifth and sixth external electrodes 135 and 136 may be extended from side surfaces 5 and 6 of a ceramic body 110 in the length direction to portions of upper and lower surfaces 2 and 1.

The fifth and sixth external electrodes 135 and 136 may be extended to the portions of the upper surface 2, and a resistance layer 150 may be disposed to cover the fifth and sixth external electrodes.

Referring to FIG. 9, the fifth and sixth external electrodes 135 and 136 may be extended to the portions of the upper surface 2, and the resistance layer 150 may be disposed to cover the fifth and sixth external electrodes.

As shown in FIG. 11, first, third, fifth, and sixth external electrodes 131, 133, 135, and 136 may be all connected to the resistance layer 150.

Therefore, as the fifth and sixth external electrodes 135 and 136 are formed, the multilayer ceramic capacitor 100' according to another exemplary embodiment of the present disclosure may operate as an array.

Figure 13:
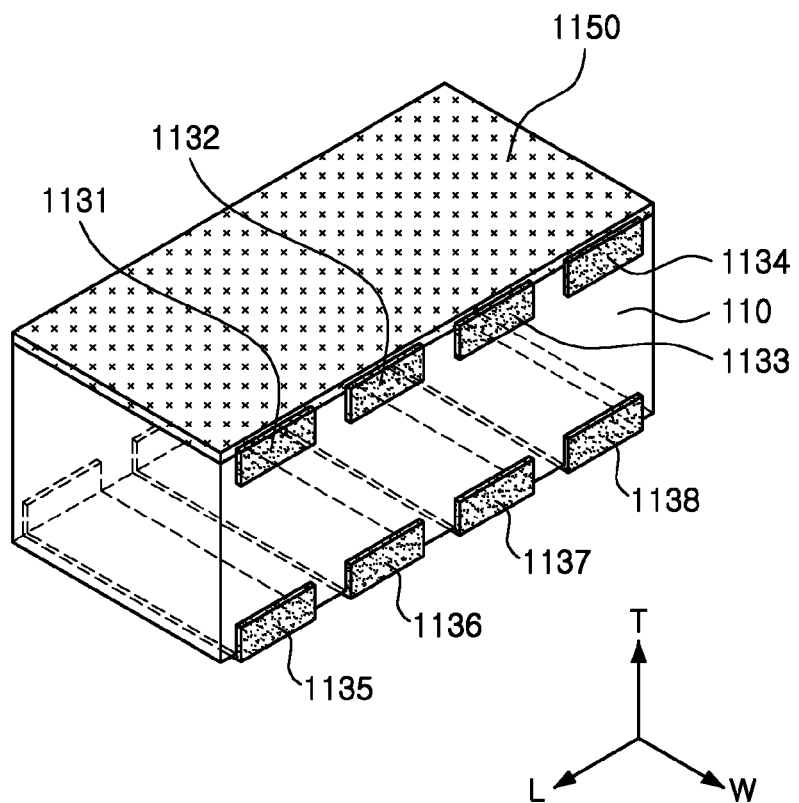
FIG. 13 is a schematic perspective view of a multilayer ceramic capacitor according to another exemplary embodiment of the present disclosure.
Figure 14:
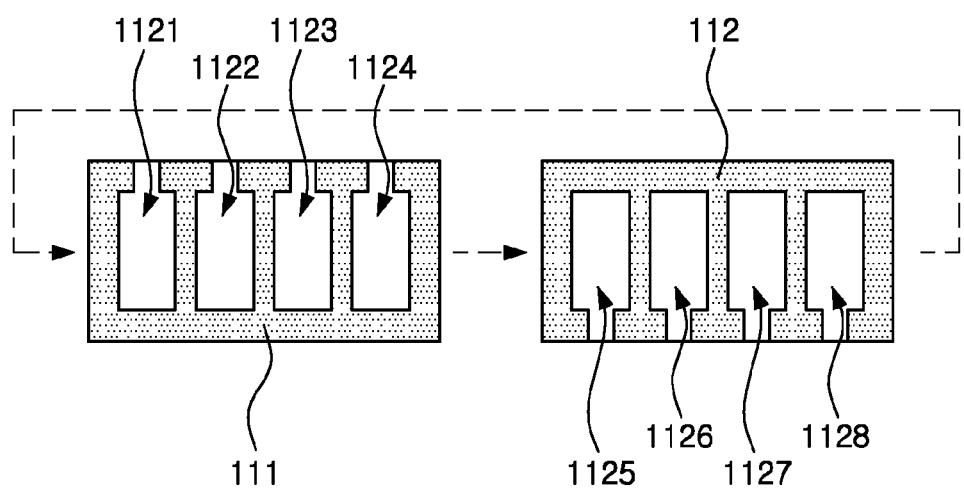
FIG. 14 is a plan diagram schematically showing an example of internal electrodes of the multilayer ceramic capacitor of FIG. 13.
Figure 15:
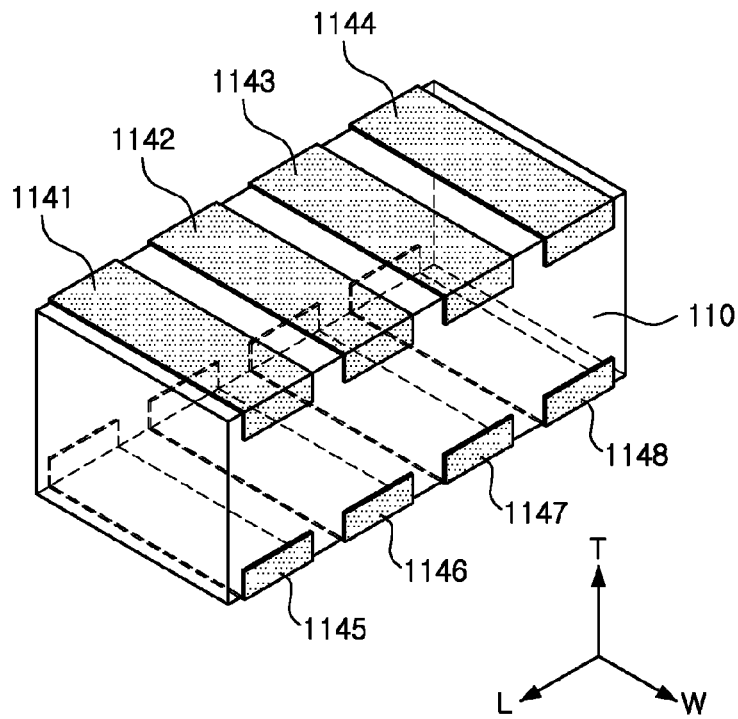
FIG. 15 is a schematic perspective diagram of a multilayer ceramic capacitor on which external electrodes are formed.

FIG. 13 is a schematic perspective view of a multilayer ceramic capacitor according to another exemplary embodiment of the present disclosure, FIG. 14 is a plan diagram schematically showing an example of internal electrodes of the multilayer ceramic capacitor of FIG. 13, and FIG. 15 is a schematic perspective diagram of the multilayer ceramic capacitor on which external electrodes are formed.

Hereinafter, a structure of the multilayer ceramic capacitor according to another exemplary embodiment of the present disclosure will be described with reference to FIGS. 13 through 15.

The multilayer ceramic capacitor according to another exemplary embodiment of the present disclosure may include: a ceramic body 110 in which first and second dielectric layers are layered in a width direction; a plurality of first internal electrodes 1121 to 1124 disposed on the first dielectric layer 111 and partially exposed to an upper surface of the ceramic body 110; a plurality of second internal electrodes 1125 to 1128 disposed on the second dielectric layer 112 and partially exposed to a lower surface of the ceramic body 110; a plurality of upper external electrodes 1131 to 1134 disposed on the upper surface of the ceramic body 110 and connected to the first internal electrodes 1121 to 1124, respectively; a plurality of lower external electrodes 1135 to 1138 disposed on the lower surface of the ceramic body 110 and connected to the second internal electrodes 1125 to 1128, respectively; and a resistance layer 1150 disposed on the upper surface of the ceramic body 110 to cover the upper external electrodes.

The internal electrodes, the external electrodes, and the resistance part are the same as described above.

Figure 16:
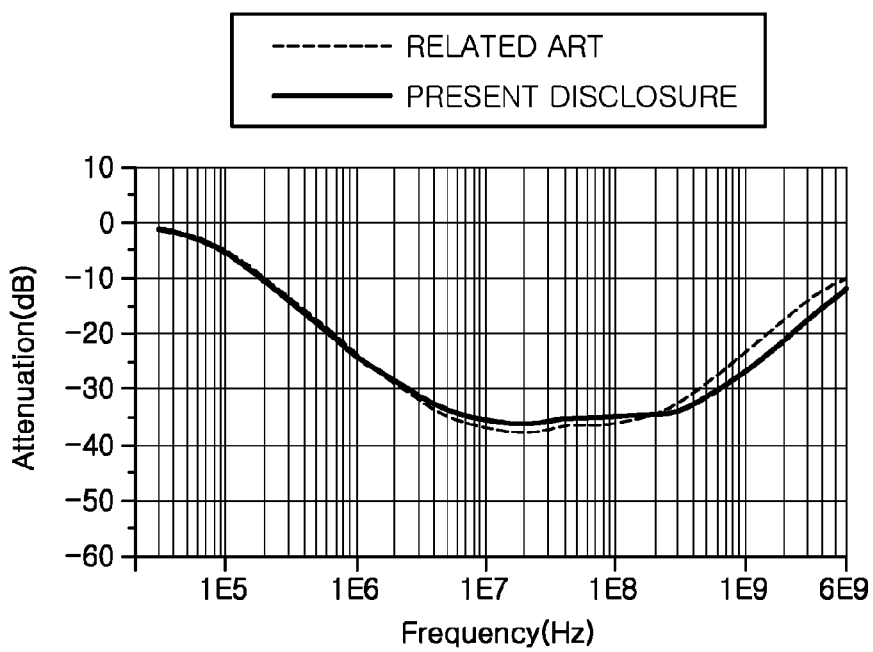
FIG. 16 shows measurement results of inductance of a multilayer ceramic capacitor according to another exemplary embodiment of the present disclosure.

FIG. 16 shows measurement results of inductance of a multilayer ceramic capacitor according to another exemplary embodiment of the present disclosure.

Referring to FIG. 16, it may be confirmed that ESL of a multilayer ceramic capacitor manufactured according to the related art was 0.26 nH, but ESL of the multilayer ceramic capacitor according to another exemplary embodiment of the present disclosure was decreased to 0.18 nH.

For example, in the multilayer ceramic capacitor according to another exemplary embodiment of the present disclosure, external electrodes disposed to be adjacent to each other in a length direction of a ceramic body at the time of mounting the multilayer ceramic capacitor may have different polarities, so that inductance may interact therebetween.

Therefore, ESL may be decreased, and high frequency characteristics may be improved.

Board Having Multilayer Ceramic Capacitor

Figure 17:
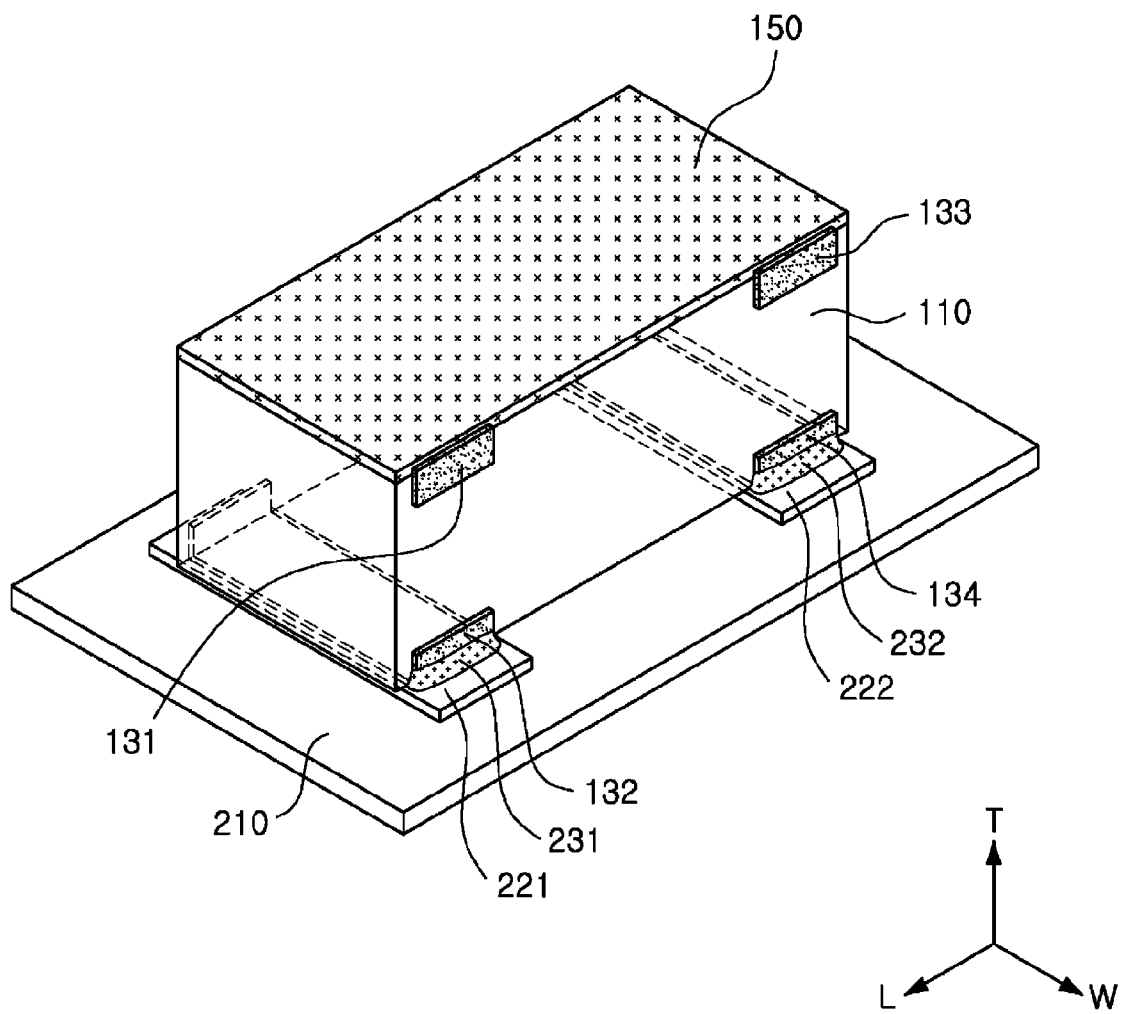
FIG. 17 is a schematic perspective diagram of a board having the multilayer ceramic capacitor according to an exemplary embodiment of the present disclosure.

FIG. 17 is a schematic perspective diagram of aboard having the multilayer ceramic capacitor according to an exemplary embodiment of the present disclosure.

Referring to FIG. 17, a board having the multilayer ceramic capacitor according to an exemplary embodiment of the present disclosure my include a circuit board 210 on which the multilayer ceramic capacitor 100 is horizontally mounted and first and second electrode pads 221 and 222 formed on an upper surface of the circuit board 210 to be spaced apart from each other.

In this case, the second and fourth external electrodes 132 and 134 may be disposed to face the circuit board 210, and the multilayer ceramic capacitor 100 may be electrically connected to the circuit board 210 by solders 231 and 232 in a state in which the second and fourth external electrodes 132 and 134 are positioned on the first and second electrode pads 221 and 222, respectively, to come in contact with each other.

Figure 18:
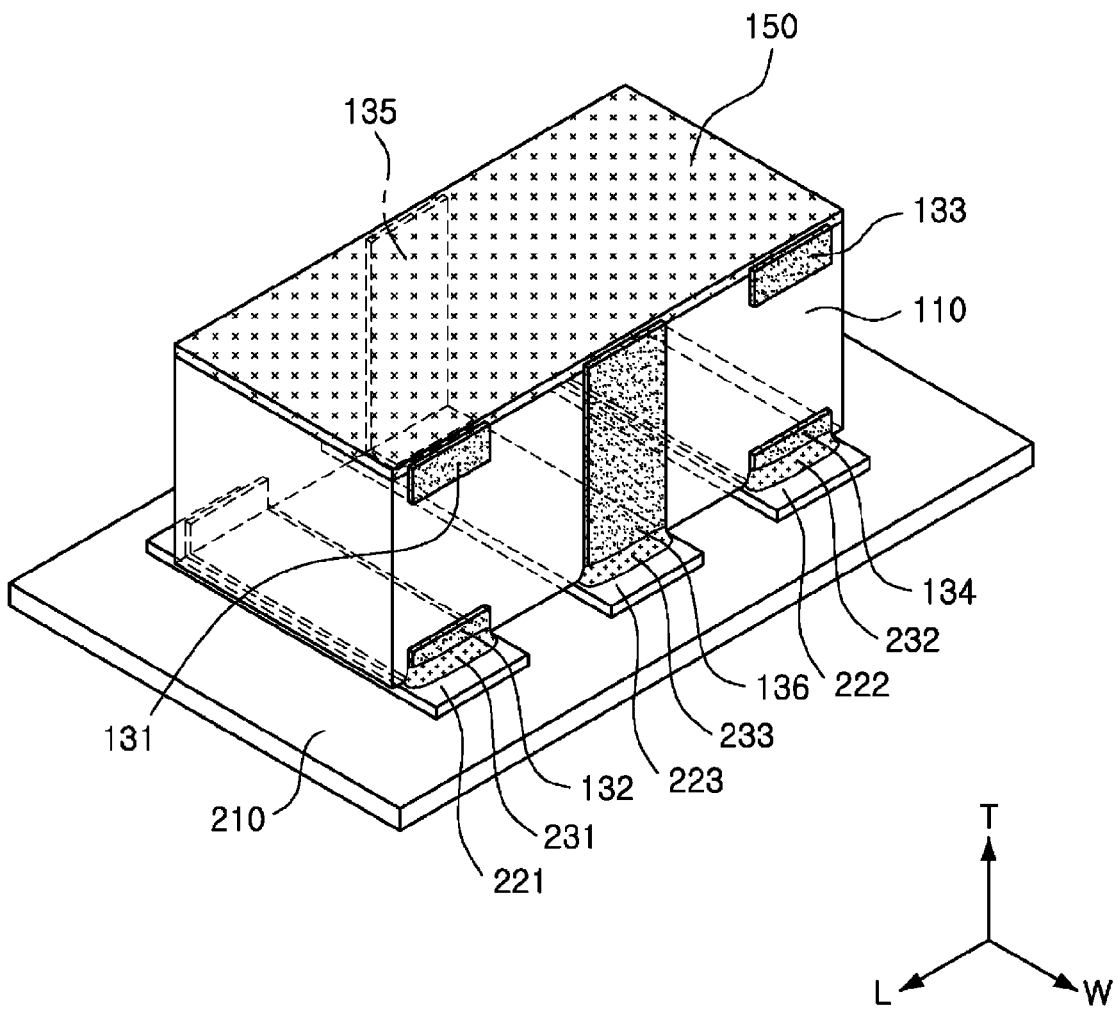
FIG. 18 is a schematic perspective diagram of a board having the multilayer ceramic capacitor according to another exemplary embodiment of the present disclosure.

FIG. 18 is a schematic perspective diagram of aboard having the multilayer ceramic capacitor according to another exemplary embodiment of the present disclosure.

Referring to FIG. 18, a board having the multilayer ceramic capacitor according to another exemplary embodiment of the present disclosure may include a circuit board 210 on which the multilayer ceramic capacitor is horizontally mounted and first and second electrode pads 221 and 222 formed on an upper surface of the circuit board 210 to be spaced apart from each other.

In addition, a third electrode pad 223 may be disposed between the first and second electrode pads 221 and 222 to be spaced apart from the first and second electrode pads 221 and 222.

In this case, the second and fourth external electrodes 132 and 134 may be disposed to face the circuit board 210, and the multilayer ceramic capacitor may be electrically connected to the circuit board 210 by solders 231 and 232 in a state in which the second and fourth external electrodes 132 and 134 are positioned on the first and second electrode pads 221 and 222, respectively, to come in contact with each other.

In addition, the multilayer ceramic capacitor 100' may be electrically connected to the circuit board 210 by solder 233 in a state in which the fifth and sixth external electrodes 135 and 136 are positioned on the third electrode pad 223 to come in contact with each other.

Figure 19:
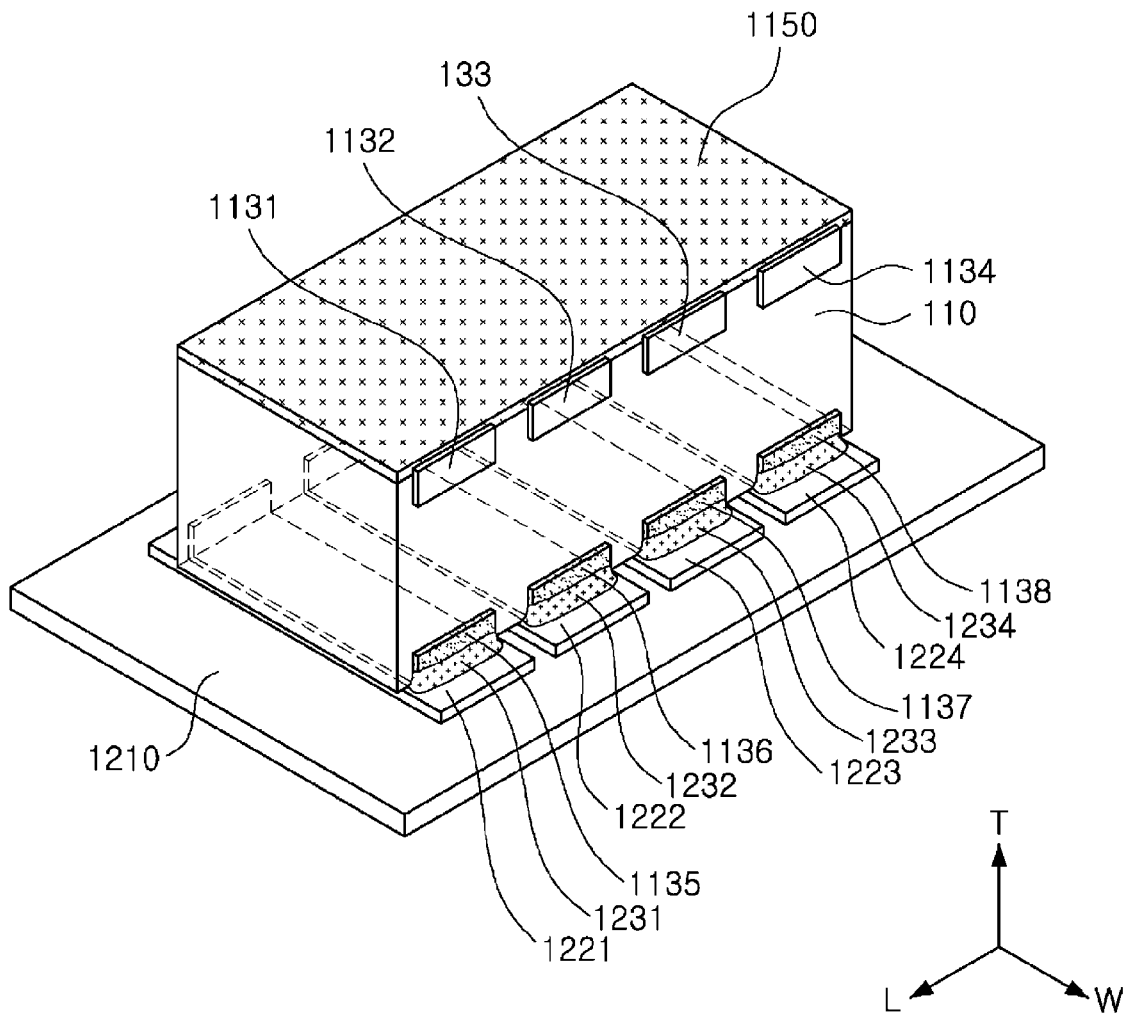
FIG. 19 is a schematic perspective diagram of a board having the multilayer ceramic capacitor according to another exemplary embodiment of the present disclosure.

FIG. 19 is a schematic perspective diagram of aboard having the multilayer ceramic capacitor according to another exemplary embodiment of the present disclosure.

The board having the multilayer ceramic capacitor according to another exemplary embodiment of the present disclosure may include a circuit board 1210 on which the multilayer ceramic capacitor is horizontally mounted and a plurality of electrode pads 1221 to 1224 formed on an upper surface of the circuit board 1210 to be spaced apart from each other.

In this case, the plurality of lower external electrodes 1135 to 1138 may be disposed to face the circuit board, and the multilayer ceramic capacitor may be electrically connected to the circuit board 1210 by solders 231 to 234 in a state in which the plurality of lower external electrodes 1135 to 1138 are positioned on the plurality of electrode pads 1221 to 1224, respectively.

As set forth above, in the multilayer ceramic capacitor according to exemplary embodiments of the present disclosure, the desired ESR may be obtained by adjusting a level of conductivity, the thickness, or the size of the resistance layer.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body in which first and second dielectric layers are layered in a width direction of the ceramic body;
   a first internal electrode disposed on the first dielectric layer and partially exposed to an upper surface of the ceramic body;

a second internal electrode disposed on the second dielectric layer and partially exposed to a lower surface of the ceramic body;
a third internal electrode disposed on the first dielectric layer and partially exposed to the upper surface of the ceramic body;
a fourth internal electrode disposed on the second dielectric layer and partially exposed to the lower surface of the ceramic body;
a first external electrode disposed on the upper surface of the ceramic body and connected to the first internal electrode;
a second external electrode disposed on the lower surface of the ceramic body and connected to the second internal electrode;
a third external electrode disposed on the upper surface of the ceramic body, connected to the third internal electrode, and spaced apart from the first external electrode;
a fourth external electrode disposed on the lower surface of the ceramic body, connected to the fourth internal electrode, and spaced apart from the second external electrode; and
a resistance layer disposed on the upper surface of the ceramic body to cover the first and third external electrodes,
wherein the resistance layer is connected in series to a capacitor formed by internal electrodes among the first, second, third or fourth internal electrodes.

2. The multilayer ceramic capacitor of claim 1, wherein a level of conductivity, a thickness, or a size of the resistance layer is adjusted to adjust equivalent series resistance (ESR).

3. The multilayer ceramic capacitor of claim 1, wherein the first and third internal electrodes are disposed to be spaced apart from each other on the same first dielectric layer, and
the second and fourth internal electrodes are disposed to be spaced apart from each other on the same second dielectric layer.

4. The multilayer ceramic capacitor of claim 1, wherein the first and third internal electrodes are disposed on different first dielectric layers, and
the second and fourth internal electrodes are disposed on different second dielectric layers.

5. The multilayer ceramic capacitor of claim 1, further comprising:
a fifth external electrode extended from at least one side surface of the ceramic body to portions of the upper and lower surfaces of the ceramic body; and
a sixth external electrode extended from at least one side surface of the ceramic body to portions of the upper and lower surfaces of the ceramic body.

6. The multilayer ceramic capacitor of claim 5, wherein the resistance layer is disposed to cover the fifth and sixth external electrodes disposed on the upper surface of the ceramic body.

7. A multilayer ceramic capacitor comprising:
a ceramic body in which first and second dielectric layers are layered in a width direction of the ceramic body;
a first internal electrode disposed on the first dielectric layer and partially exposed to an upper surface of the ceramic body;
a second internal electrode disposed on the second dielectric layer and partially exposed to a lower surface of the ceramic body;
third and fourth internal electrodes disposed on the first and second dielectric layers, respectively, and partially exposed to the upper and lower surfaces of the ceramic body;
a first external electrode disposed on the upper surface of the ceramic body and connected to the first internal electrode;
a second external electrode disposed on the lower surface of the ceramic body and connected to the second internal electrode;
a third external electrode disposed on the upper surface of the ceramic body, connected to the third and fourth internal electrodes, and spaced apart from the first external electrode;
a fourth external electrode disposed on the lower surface of the ceramic body, connected to the third and fourth internal electrodes, and spaced apart from the second external electrode; and
a resistance layer disposed on the upper surface of the ceramic body to cover the first and third external electrodes,
wherein the resistance layer is connected in series to a capacitor formed by internal electrodes among the first, second, third or fourth internal electrodes.

8. The multilayer ceramic capacitor of claim 7, wherein a level of conductivity, a thickness, or a size of the resistance layer is adjusted to adjust equivalent series resistance (ESR).

9. A multilayer ceramic capacitor comprising:
a ceramic body in which first and second dielectric layers are layered in a width direction of the ceramic body;
a plurality of first internal electrodes disposed on the first dielectric layer and partially exposed to an upper surface of the ceramic body;
a plurality of second internal electrodes disposed on the second dielectric layer and partially exposed to a lower surface of the ceramic body;
a plurality of upper external electrodes disposed on the upper surface of the ceramic body and respectively connected to the first internal electrodes;
a plurality of lower external electrodes disposed on the lower surface of the ceramic body and respectively connected to the second internal electrodes; and
a resistance layer disposed on the upper surface of the ceramic body to cover the upper external electrodes,
wherein the resistance layer is connected in series to a capacitor formed by internal electrodes among the plurality of first or second internal electrodes.

10. The multilayer ceramic capacitor of claim 9, wherein a level of conductivity, a thickness, or a size of the resistance layer is adjusted to adjust equivalent series resistance (ESR).

11. A board having a multilayer ceramic capacitor, the board comprising:
a circuit board having first and second electrode pads formed on the circuit board; and
the multilayer ceramic capacitor mounted on the circuit board,
wherein the multilayer ceramic capacitor includes:
a ceramic body in which first and second dielectric layers are layered in a width direction of the ceramic body;
a first internal electrode disposed on the first dielectric layer and partially exposed to an upper surface of the ceramic body;
a second internal electrode disposed on the second dielectric layer and partially exposed to a lower surface of the ceramic body;

a third internal electrode disposed on the first dielectric layer and partially exposed to the upper surface of the ceramic body;
a fourth internal electrode disposed on the second dielectric layer and partially exposed to the lower surface of the ceramic body;
a first external electrode disposed on the upper surface of the ceramic body and connected to the first internal electrode;
a second external electrode disposed on the lower surface of the ceramic body and connected to the second internal electrode;
a third external electrode disposed on the upper surface of the ceramic body, connected to the third internal electrode, and spaced apart from the first external electrode;
a fourth external electrode disposed on the lower surface of the ceramic body, connected to the fourth internal electrode, and spaced apart from the second external electrode; and
a resistance layer disposed on the upper surface of the ceramic body to cover the first and third external electrodes,
the second external electrode being connected to the first electrode pad,
the fourth external electrode being connected to the second electrode pad, and
wherein the resistance layer is connected in series to a capacitor formed by internal electrodes among the first, second, third or fourth internal electrodes.

12. The board of claim 11, wherein a level of conductivity, a thickness, or a size of the resistance layer is adjusted to adjust equivalent series resistance (ESR).

13. The board of claim 11, wherein the first and third internal electrodes are disposed to be spaced apart from each other on the same first dielectric layer, and
the second and fourth internal electrodes are disposed to be spaced apart from each other on the same second dielectric layer.

14. The board of claim 11, wherein the first and third internal electrodes are disposed on different first dielectric layers, and
the second and fourth internal electrodes are disposed on different second dielectric layers.

15. The board of claim 11, wherein the multilayer ceramic capacitor further includes:
a fifth external electrode extended from at least one side surface of the ceramic body to portions of the upper and lower surfaces of the ceramic body; and
a sixth external electrode extended from at least one side surface of the ceramic body to portions of the upper and lower surfaces of the ceramic body.

16. The board of claim 15, wherein the resistance layer is disposed to cover the fifth and sixth external electrodes disposed on the upper surface of the ceramic body.

17. The board of claim 15, further comprising a third electrode pad formed on the circuit board,
wherein the fifth and sixth external electrodes are connected to the third electrode pad.

18. A board having a multilayer ceramic capacitor, the board comprising:
a circuit board having first and second electrode pads formed on the circuit board; and
the multilayer ceramic capacitor mounted on the circuit board,
wherein the multilayer ceramic capacitor includes:
a ceramic body in which first and second dielectric layers are layered in a width direction of the ceramic body;
a first internal electrode disposed on the first dielectric layer and partially exposed to an upper surface of the ceramic body;
a second internal electrode disposed on the second dielectric layer and partially exposed to a lower surface of the ceramic body;
third and fourth internal electrodes disposed on the first and second dielectric layers, respectively, and partially exposed to the upper and lower surfaces of the ceramic body;
a first external electrode disposed on the upper surface of the ceramic body and connected to the first internal electrode;
a second external electrode disposed on the lower surface of the ceramic body and connected to the second internal electrode;
a third external electrode disposed on the upper surface of the ceramic body, connected to the third and fourth internal electrodes, and spaced apart from the first external electrode;
a fourth external electrode disposed on the lower surface of the ceramic body, connected to the third and fourth internal electrodes, and spaced apart from the second external electrode; and
a resistance layer disposed on the upper surface of the ceramic body to cover the first and third external electrodes,
the second external electrode being connected to the first electrode pad,
the fourth external electrode being connected to the second electrode pad, and
wherein the resistance layer is connected in series to a capacitor formed by internal electrodes among the first, second, third or fourth internal electrodes.

19. The board of claim 18, wherein a level of conductivity, a thickness, or a size of the resistance layer is adjusted to adjust equivalent series resistance (ESR).

20. A board having a multilayer ceramic capacitor, the board comprising:
a circuit board having a plurality of electrode pads formed on the circuit board; and
the multilayer ceramic capacitor mounted on the circuit board,
wherein the multilayer ceramic capacitor includes:
a ceramic body in which first and second dielectric layers are layered in a width direction of the ceramic body;
a plurality of first internal electrodes disposed on the first dielectric layer and partially exposed to an upper surface of the ceramic body;
a plurality of second internal electrodes disposed on the second dielectric layer and partially exposed to a lower surface of the ceramic body;
a plurality of upper external electrodes disposed on the upper surface of the ceramic body and respectively connected to the first internal electrodes;
a plurality of lower external electrodes disposed on the lower surface of the ceramic body and respectively connected to the second internal electrodes; and
a resistance layer disposed on the upper surface of the ceramic body to cover the upper external electrodes,
the plurality of lower external electrodes being connected to the plurality of electrode pads, respectively, and
wherein the resistance layer is connected in series to a capacitor formed by internal electrodes among the plurality of first or second internal electrodes.

* * * * *